United States Patent [19]

Hirose

[11] Patent Number: 4,567,552
[45] Date of Patent: Jan. 28, 1986

[54] PHASE CONTROL DEVICE FOR A POWER CONVERTER

[75] Inventor: Syunichi Hirose, Tokyo, Japan

[73] Assignee: Kabushiki Kaisha Toshiba, Kawasaki, Japan

[21] Appl. No.: 669,373

[22] Filed: Nov. 8, 1984

[30] Foreign Application Priority Data

Nov. 18, 1983 [JP] Japan ................................ 58-217251

[51] Int. Cl.⁴ ...................... H02M 7/155; H02P 13/24
[52] U.S. Cl. ......................................... 363/87; 363/129
[58] Field of Search ....................... 363/84, 85, 86, 87, 363/88, 128, 129

[56] References Cited

U.S. PATENT DOCUMENTS

| | | | |
|---|---|---|---|
| 4,438,487 | 3/1984 | Kawai | 363/129 |
| 4,455,598 | 6/1984 | Andre | 363/129 X |
| 4,464,711 | 8/1984 | Hosokawa et al. | 363/87 |
| 4,489,323 | 12/1984 | Glennon et al. | 363/87 |
| 4,490,780 | 12/1984 | Nondahl | 363/87 |

FOREIGN PATENT DOCUMENTS 53-14457 5/1978 Japan .
57-3573 1/1982 Japan .
57-52784 11/1982 Japan .

Primary Examiner—Peter S. Wong
Attorney, Agent, or Firm—Oblon, Fisher, Spivak, McClelland & Maier

[57] ABSTRACT

A phase control device for a power converter with a plurality of controlled rectifier elements, including a phase detector for detecting a phase of an AC voltage of the power converter to produce a phase signal. A processing circuit for receiving an electrical quantity appearing at an AC side or a DC side of the power converter as a feedback signal and for comparing the feedback signal with a reference signal to produce a phase control signal so that the feedback signal becomes equal to the reference signal, and a firing pulse determination circuit for comparing the phase signal with the phase control signal to produce a plurality of firing pulses, which are adapted to be connected to selected of the controlled rectifier elements to fire the controlled rectifier elements. The processing circuit includes a monitoring circuit which judges whether or not the phase control device has failed based on the phase signal, the phase control signal and a specific firing pulse from the firing pulse determination circuit.

5 Claims, 9 Drawing Figures

PHASE CONTROL DEVICE FOR A POWER CONVERTER

BACKGROUND OF THE INVENTION

1. Field of the Invention

This invention relates generally to a power converter and more particularly to a phase control device for a power converter.

2. Description of the Prior Art

A power converter including controlled rectifier elements may be operated either as a rectifier or as an inverter by the individual control of firing phases of the respective controlled rectifier elements. FIG. 1 shows a power converter 1 which includes controlled rectifier elements connected in three-phase bridge connection, such as thyristors U, V, W, X, Y and Z. In FIG. 1, when the power converter 1 is operated as a rectifier, an AC power received from AC terminals R, S and T is converted into a DC power which is outputted to DC terminals N and P. On the contrary, when operating as an inverter, a DC power received from the DC terminals N and P is converted into an AC power, which is outputted to the AC terminals R, S and T.

A phase control device for controlling firing phases of the respective controlled rectifier elements in a power converter has conventionally employed an AC-DC superimposed method in analog fashion. Recently, however, significant developments in digital technology, particularly in microcomputers and memory elements, cause such a phase control device to be digitized.

FIG. 1 also shows a digital-type phase control device 2 type for controlling the firing phases of the thyristors U, V, W, X, Y and Z. The phase control device 2 receives, through potential transformers 5R, 5S and 5T, AC voltage signals $e_R$, $e_S$ and $e_T$ which are in-phase with respect to voltages across the AC terminals R, S and T, respectively. The phase control device 2 also receives a DC current of the power converter 1 through a current transformer 6 as a feedback signal FED. Instead of the DC current of the power converter 1, an AC voltage, an AC current or a DC voltage of the power converter 1 may be used as the feedback signal FED. The phase control device 2 further receives a reference signal REF and produces a firing pulse TP to control the firing phases of the thyristors U, V, W, X, Y and Z of the power converter 1 based on the AC voltage signals $e_R$, $e_S$ and $e_T$, the feedback signal FED and the reference signal REF. The firing pulse TP includes firing pulses TPU, TPV, TPW, TPX, TPY and TPZ, which are applied to gates of the thyristors U, V, W, X, Y and Z, respectively.

FIG. 2 shows a digitized construction of the phase control device 2 in detail. In FIG. 2, the phase control device 2 includes a digital phase detector 10, a digital processing circuit 11 and a firing pulse determination circuit 12. The firing pulse determination circuit 12 includes a digital comparator 13 and a gate logic circuit 14. The phase detector 10 receives the AC voltage signals $e_R$, $e_S$ and $e_T$ from the power converter 1 through the potential transformers 5R, 5S and 5T, respectively, and produces a digital phase signal $\theta$ in synchronism with the received AC voltage signals $e_R$, $e_S$ and $e_T$. The digital phase signal $\theta$ includes a phase synchronizing signal $\theta 1$ and a phase judging signal $\theta 2$. The digital processing circuit 11 receives the feedback signal FED through the current transformer 6 from the power converter 1 and the reference signal REF, and produces a digital phase control signal Ec so that the feedback signal FED becomes equal to the reference signal REF. The digital processing circuit 11 is usually constructed with a microcomputer, as will be described later in detail. The digital phase control signal Ec includes a control signal $\delta 1$ and an angle signal $\delta 2$. The digital comparator 13 in the firing pulse determination circuit 12 compares the phase synchronizing signal $\theta 1$ from the digital phase detector 10 with the control signal $\delta 1$ from the digital processing circuit 11, and outputs a pulse COM when the value of the phase synchronizing signal $\theta 1$ is larger than or equal to the value of the control signal $\delta 1$ ($\theta 1 \geq \delta 1$). The gate logic circuit 14 receives the phase judging signal $\theta 2$ from the digital phase detector 10, the pulse COM from the digital comparator 13 and the angle signal $\delta 2$ from the digital processing circuit 11 and produces the firing pulse TP so as to control the firing phases of the thyristors U, V, W, X, Y and Z in the power converter 1.

FIG. 3 shows an example of a detailed configuration of the digital phase detector 10 shown in FIG. 2. In FIG. 3, the digital phase detector 10 has a conventional so-called phased locked loop circuit, in which the frequency of an output pulse of a voltage control oscillator 22 is devided by $2^8 (=256)$ by a counter 33. The frequency of an output pulse of the counter 23 is further divided by six by a counter 24. The count of the counter 24 is applied to a decoder 25 which produces three-phase output signals $e_{1R}$, $e_{1S}$ and $e_{1T}$. These three-phase output signals $e_{1R}$, $e_{1S}$ and $e_{1T}$ are compared in terms of the respective phases, with the AC voltage signals $e_R$, $e_S$ and $e_T$ in phase comparators 17, 18 and 19, respectively. The phase differences thus obtained in the phase comparators 17, 18 and 19 are added up in an adder 20 to produce an added signal. The added signal is applied to a loop filter 21, which derives a DC component from the added signal. The derived DC component is applied to the voltage control oscillator 22 to control the frequency of the output pulse thereof.

The above-described configuration allows that the outputs of the counters 23 and 24 and the output of the decoder 25 become synchronous with the three-phase AC voltage signals $e_R$, $e_S$ and $e_T$. The counter 23 repeats counting from 0 to 255 in synchronism with an electrical angle of 60° of the AC power source voltage, and the output signal of the counter 23 is the phase synchronizing signal $\theta 1$ of 8-bit binary. The counter 24 receives a carry signal SYNC from the counter 23 and the output signal of the counter 24 is the phase judging signal $\theta 2$.

FIG. 4 shows a detailed configuration of the digital processing circuit 11 shown in FIG. 2. The digital processing circuit 11 includes a computer 30 and a sampling pulse generator 35. The computer 30 includes a central processing unit 31, a memory unit 32, an input port 33 and an output port 34. The central processing unit 31 receives the reference signal REF and the feedback signal FED through the input port 33 at every reception of a sampling pulse SMP from the sampling pulse generator 35, and performs a specified calculation based on the programs and the data stored in the memory unit 32, then it outputs the calculated result as the digital phase control signal Ec through the output port 34. The digital phase control signal Ec is a 10-bit binary signal. The upper two bits thereof are utilized as the angle signal $\delta 2$ and the lower eight bits thereof are utilized as the control signal $\delta 1$.

The control signal $\delta1$ thus obtained is compared with the phase synchronizing signal $\theta1$ from the counter 23 of the digital phase detector 10 in the digital comparator 13, which produces the pulse COM when $\theta1 \geq \delta1$.

The phase judging signal $\theta2$ from the counter 24 is of a hexary code, and the angle signal $\delta2$ which is the upper two bits of the digital phase control signal Ec is of a ternary code, as shown in Table 1.

TABLE 1

| $\theta2$ | 0 | 1 | 2 | 3 | 4 | 5 |
|---|---|---|---|---|---|---|
| $\delta2$ | 0 | 1 | 2 | | | |

One count of the phase judging signal $\theta2$ corresponds to an electrical angle of 60° of the line voltage, such as the line voltage $e_{RS}$, of the AC power source provided with the AC voltage $e_R$, $e_S$ and $e_T$, respectively. Here, each of the thyristors U, V, W, X, Y and Z is controllable during the period of an electrical angle of 180° of the AC power source voltage. When the period of 180° is devided into three equal periods of 60°, the phase judging signal $\theta2$ designates which period of the three the digital phase control signal Ec lies in.

On the basis of the value shown in Table 1, firing phases of the thyristors U, V, W, X, Y and Z in the power converter 1 are judged in the gate logic circuit 14 in such a manner as shown in Table 2.

TABLE 2

| $\theta2-\delta2$ | 0 | 1 | 2 | 3 | 4<br>-2 | 5<br>-1 |
|---|---|---|---|---|---|---|
| firing phase | U | Z | V | X | W | Y |

The gate logic circuit 14 judges a firing phase to be next fired based on the difference between the phase judging signal $\theta2$ and the angle signal $\delta2$, and feeds the firing pulses TPU, TPV, TPW, TPX, TPY and TPZ to the corresponding thyristors U, V, W, X, Y and Z, respectively.

FIG. 5 is a diagram to explain the process of firing phase determination in the firing pulse determination circuit 12. The phase synchronizing signal $\theta1$ repeats counting from 0 to $(2^8-1)$ at every one-sixth period of the AC power source, i.e., at every 60° of an electrical angle, in synchronism with the AC power source line voltage $e_{RS}$. On the other hand, since the phase judging signal $\theta2$ counts the carry signals SYNC of the 8-bit binary counter 23, triangular waves shown in FIG. 5 may be considered as numerically designated. So the values of the phase judging signal $\theta2$ are represented as the reference numerals of the triangular waves. In this connection, the digital phase signal $\theta$ is shown in a two-dot chain line. The digital phase control signal Ec may be considered to vary in such a manner as shown in a solid line Ec when the angle signal $\delta2$ is represented as shown on the left side of FIG. 5.

Here, the firing pulses TPU, TPV, TPW, TPX, TPY and TPZ for the respective thyristors U, V, W, X, Y and Z of the power converter 1 in FIG. 1 may be obtained as follows. For example, the firing pulse TPU for the thyristor U should be outputted in accordance with the digital phase control signal Ec during the period of either triangular wave 0, 1 or 2, namely during the period of the electrical angle of 180° of the AC power source voltage $e_{RS}$. This means that the gate logic circuit 14 judges the firing phase based on the status of both the angle signal $\delta2$ and the phase judging signal $\theta2$ at the time when the pulse COM is outputted from the digital comparator 13. This is illustrated in FIG. 5 in such a manner that the control signal $\delta1$ is shown as a dotted line.

The pulse COM is outputted at the time when the dotted line representing the control signal $\delta1$ intersects the triangular wave representing the phase synchronizing signal $\theta1$. The gate logic circuit 14 determines which of the thyristors U, V, W, X, Y and Z is to be fired and outputs the firing pulse TPU, TPV, TPW, TPX, TPY or TPZ to the determined thyristor U, V, W, X, Y or Z.

The power converter 1, the phase control device 2, the digital phase detector 10, digital processing circuit 11 and, the firing pulse determination circuit 14 shown in FIGS. 1-4 are all conventional and are will known to those skilled in the art. Thus the more detailed explanation thereof will be omitted.

Hereinafter we will describe the cases when failures occur in the conventional phase control device 2. Firstly, when the phase control signal Ec outputted from the digital processing circuit 11 becomes an erroneous signal before being applied to the firing pulse determination circuit 12 because of noise disturbances or the like, the firing pulses TP are outputted in a specified order to the respective thyristors U, V, W, X, Y and Z in the power converter 1. In this case, the firing pulses TP are outputted at the firing periods different from the firing periods at which the normal firing pulses TP are outputted based on the normal phase control signal Ec. The power converter 1 is operated based on the erroneous firing pulse TP, assuming that the firing pulse determination circuit 12 receives the phase control signal Ec normally, and produces the firing pulses TP normally. Therefore, the abnormalities in the phase control device 2 such as those in the digital phase control signal Ec can be detected only by the main circuit phenomena such as overvoltage or overcurrent caused by the power converter 1. Accordingly, there have been such disadvantages that the abnormalities of the phase control device 2 can be detected only after the occurrence in serious failures of the entire apparatus including the power converter 1, such as failures in frequency converters, electric motor systems or mechanical load apparatus driven by electric motors.

Secondly, even when the digital phase detector 10 has failed to cause the digital phase signal $\theta$ to be abnormal, or even when the firing pulse determination circuit 12 has failed so that it has produced no firing pulses TP or has produced the firing pulses TP neither in proper phase nor in proper order, such abnormalities of the phase control device 2 can be detected only by the main circuit phenomena caused by the erroneous operation of the power converter 1. Furthermore, in the conventional phase control device 2, it has been extremely difficult to detect specific failed portions within the phase control device 2 based on the main circuit phenomena because of the complicated circuit configuration of the phase control device 2.

SUMMARY OF THE INVENTION

Accordingly, the objects of this invention are to provide a highly reliable and readily maintainable phase control device for a power converter, which can detect failures thereof within the phase control device rapidly.

These and other objects of this invention are achieved by providing a phase control device for a power converter with a plurality of controlled rectifier elements, including a phase detector adapted for connection to the power converter to receive an AC voltage of the power converter for detecting a phase of the AC voltage to produce a phase signal. The phase signal includes a phase synchronizing signal and a phase judging signal. The phase control device also includes a processing circuit adapted for connection to the power converter to receive an electrical quantity appearing at one of an AC side and a DC side of the power converter as a feedback signal for comparing the feedback signal with a reference signal to produce a phase control signal so that the feedback signal becomes equal to the reference signal. The phase control signal includes a control signal and an angle signal. The phase control device further includes a firing pulse determination circuit connected to receive the phase signal from the phase detector and the phase control signal from the processing circuit for comparing the phase signal with the phase control signal to produce a plurality of firing pulses based on the comparison result. Each of the firing pulses are adapted to be connected to selected of the controlled rectifier elements to fire each of the controlled rectifier elements. The firing pulses are outputted at a time determined by the result of the comparison of the phase synchronizing signal with the control signal. Which of the firing pulses is connected to which of the controlled rectifier elements is determined by the result of the comparison of the phase judging signal with the angle signal. The processing circuit is connected to receive one of the firing pulses from the firing pulse determination circuit as a specific firing pulse and the phase signal from the phase detector and includes a monitoring circuit. The monitoring circuit is connected to receive the phase synchronizing signal, the control signal and the specific firing pulse and judges whether or not the phase control device has failed based on the phase synchronizing signal and the control signal upon reception of the specific firing pulse. The monitoring circuit produces a fault indicating signal based on the judgement result.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
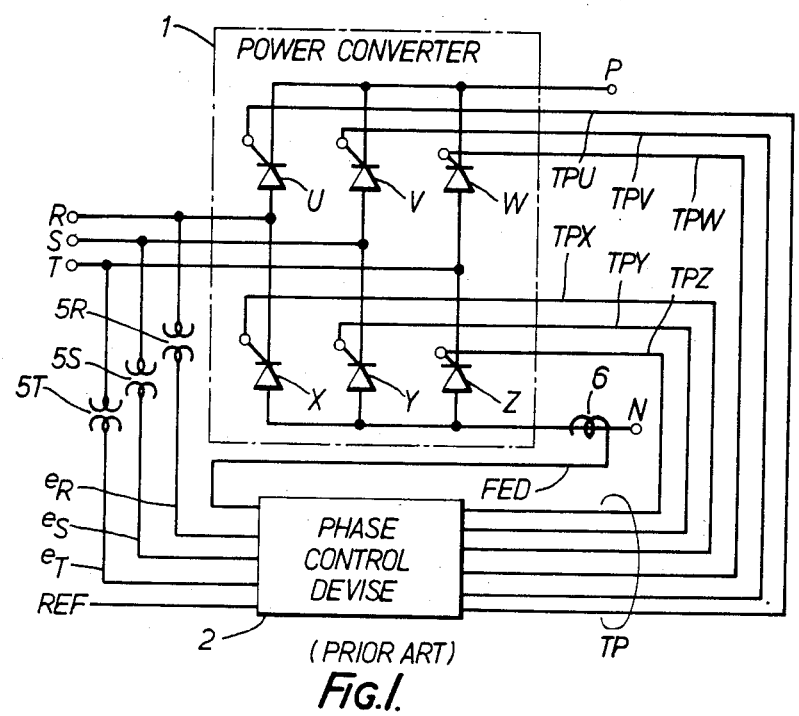
FIG. 1 is a schematic circuit diagram illustrating a conventional power converter with a phase control device.
Figure 2:
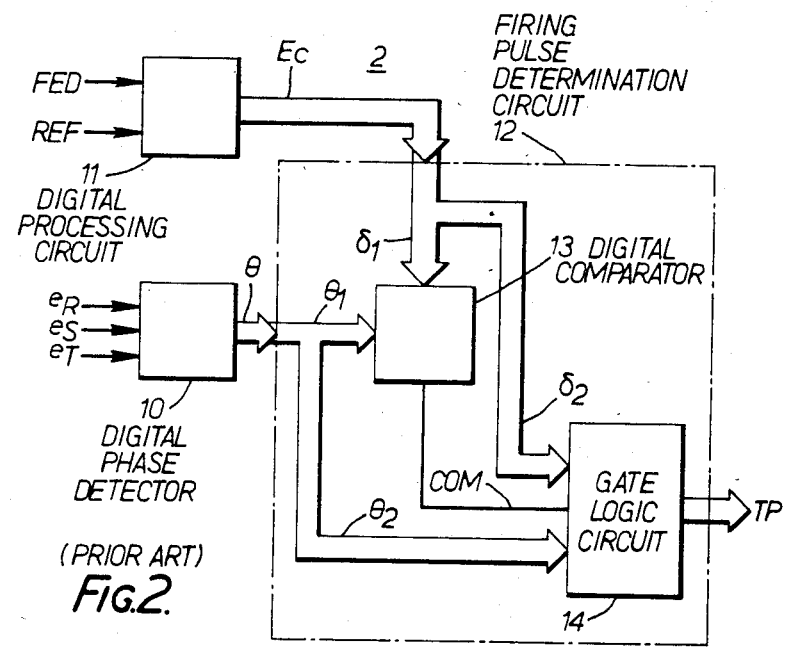
FIG. 2 is a block diagram illustrating a detailed configuration of the phase control device 2 shown in FIG. 1.
Figure 3:
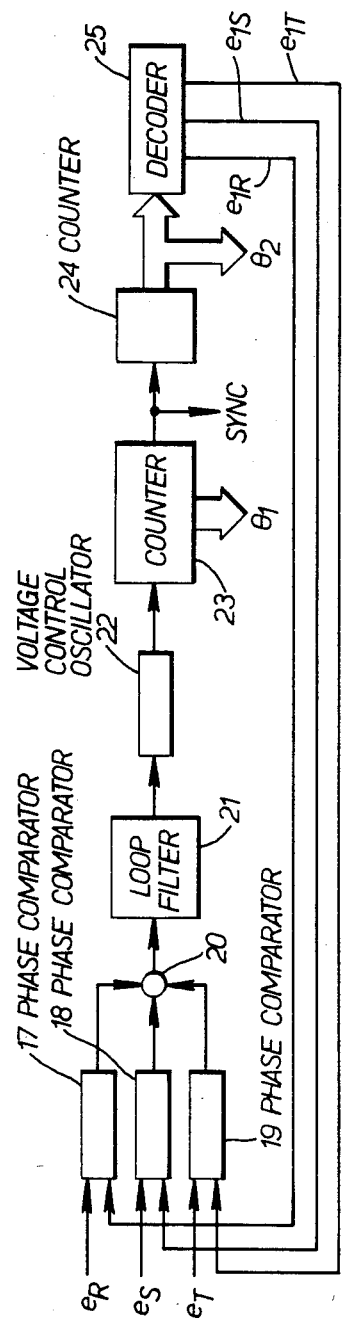
FIG. 3 is a block diagram illustrating a detailed configuration of the digital phase detector 10 shown in FIG. 2.
Figure 6:
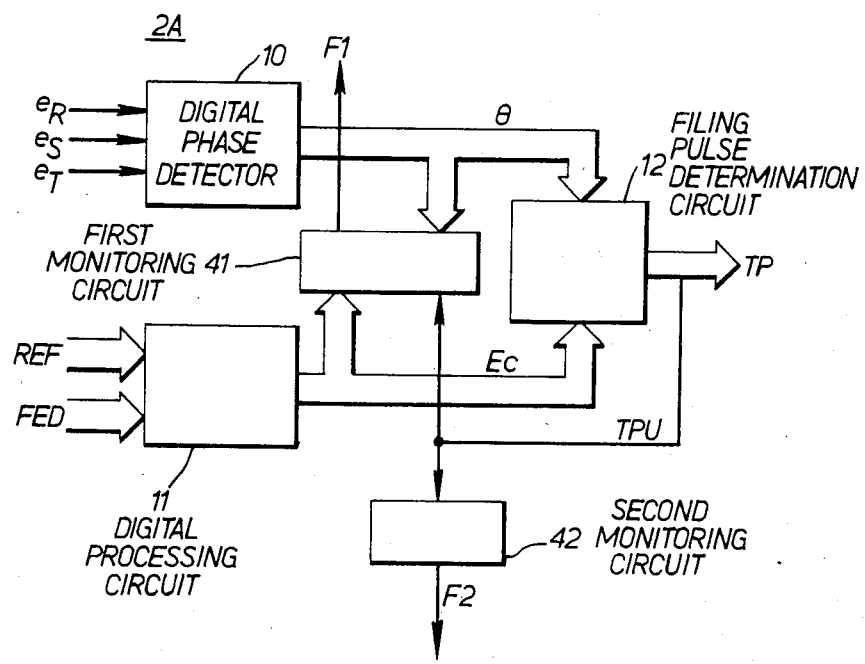
FIG. 6 is a block diagram illustrating a detailed configuration of a phase control device according to a first embodiment of this invention.

Referring now to the drawings, wherein like reference numerals designate identical or corresponding parts throughout the several views, and more particularly to FIG. 6 thereof, wherein a first preferred embodiment of this invention is shown, reference numeral 2A designates a phase control device which is used for controlling the power converter 1 instead of the phase control device 2 shown in FIG. 1. In FIG. 6, the phase control device 2A includes the digital phase detector 10, the digital processing circuit 11 and the firing phase determination circuit 12 as in the conventional phase control device 2. The phase control device 2A further includes a first monitoring circuit 41 and a second monitoring circuit 42. The first monitoring circuit 41 is connected to receive the digital phase signal $\theta$ from the digital phase detector 10 and to receive the digital phase control signal Ec from the digital processing circuit 11. The first monitoring circuit 41 is further connected to receive the firing pulse TPU from the firing pulse determination circuit 12. The first monitoring circuit 41 compares the digital phase signal $\theta$ with the digital phase control signal Ec at every appearance of the firing pulse TPU, and outputs a first fault indicating signal F1 based on the comparison result. The second monitoring circuit 42 is connected to receive the firing pulse TPU from the firing phase determination circuit 12. The second monitoring circuit 42 is a circuit to monitor whether or not the firing pulses TP are normally outputted, and includes a counter (not shown) that repeats counting up to a predetermined value, for example 1535, per one cycle, while being reset by the firing pulse TPU. When the count reaches a specific value greater than 1535, the second monitoring circuit 42 outputs a second fault indicating signal F2.

Figure 7:
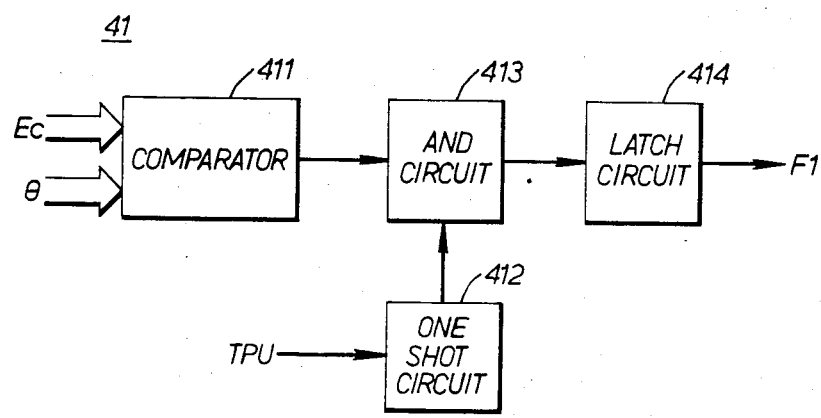
FIG. 7 is a block diagram illustrating a detailed configuration of the first monitoring circuit 41 shown in FIG. 6.

FIG. 7 shows a detailed configuration of the first monitoring circuit 41. The first monitoring circuit 41 includes a comparator 411, a one shot circuit 412, an AND circuit 413 and a latch circuit 414. The comparator 411 receives the digital phase control signal Ec and the digital phase signal $\theta$, compares these two signals and outputs a comparison signal based on the comparison result as described below. Here, when the difference between the values of these two signals is in a predetermined range (hereinafter these two signals are referred to be in a specific condition), the comparison signal is at the level of "1", and when these two signals are not in the specific condition the comparison signal is at the level of "0". The comparison signal is applied to a first input terminal of the AND circuit 413. The one shot circuit 412 receives the firing pulse TPU and outputs a signal which is at the level of "1" for a specific period after the reception of the firing pulse TPU. The output signal of the one shot circuit 412 is applied to a second input terminal of the AND circuit 413. An output signal of the AND circuit 413 is applied to the latch circuit 414 so as to be held therein.

The operations of the phase control device 2A will now be explained referring to FIG. 5. The digital phase signal $\theta$ is outputted from the digital phase detector 10 in a form of a linear function that rises linearly from zero in synchronism with the line voltage $e_{RS}$. At an instant A when the value of the digital phase signal $\theta$ is equal to that of the digital phase control signal Ec, the firing pulse TPU is outputted to the thyristor U in the power converter 1 from the firing pulse determination circuit 12. Upon receiving the firing pulse TPU, the first monitoring circuit 41 performs operations as follows. When the digital phase control signal Ec and the digital phase signal $\theta$ are in the above-described specific condition during a predetermined period from the reception of the firing pulse TPU, the outputs of the AND circuit 413 and the latch circuit 414 are at the levels of "0", which means that the phase control device 2A is in normal operation. When these two signals are not in the specific condition during the above-described predetermined period, the outputs of the AND circuit 413 and the latch circuit 414 becomes the levels of "1" and the first fault indicating signal F1 is outputted from the first monitoring circuit 41. The instant A in FIG. 5 shows the case of the normal operation, so that the first fault indicating signal F1 is not outputted.

The second monitoring circuit 42 repeats counting from zero to 1535 at every cycle in synchronism with the firing pulse TPU, as described above. When the phase control device 2A is in normal operation, it is required that the second fault indicating signal F2 is not outputted. Thus, the second monitoring circuit 42 is designed such that even when the digital phase control signal Ec is varied after the appearance of the firing pulse TPU at the instant A, the firing pulse TPU of the subsequent cycle is outputted to the thyristor U within a period of, for example, 1.5 cycle (540°) of the AC power source voltage. For instance, an electrical angle of 540° corresponds to a time of 30 milliseconds in the case that the frequency of the AC power source is 50 Hz.

Figure 5:
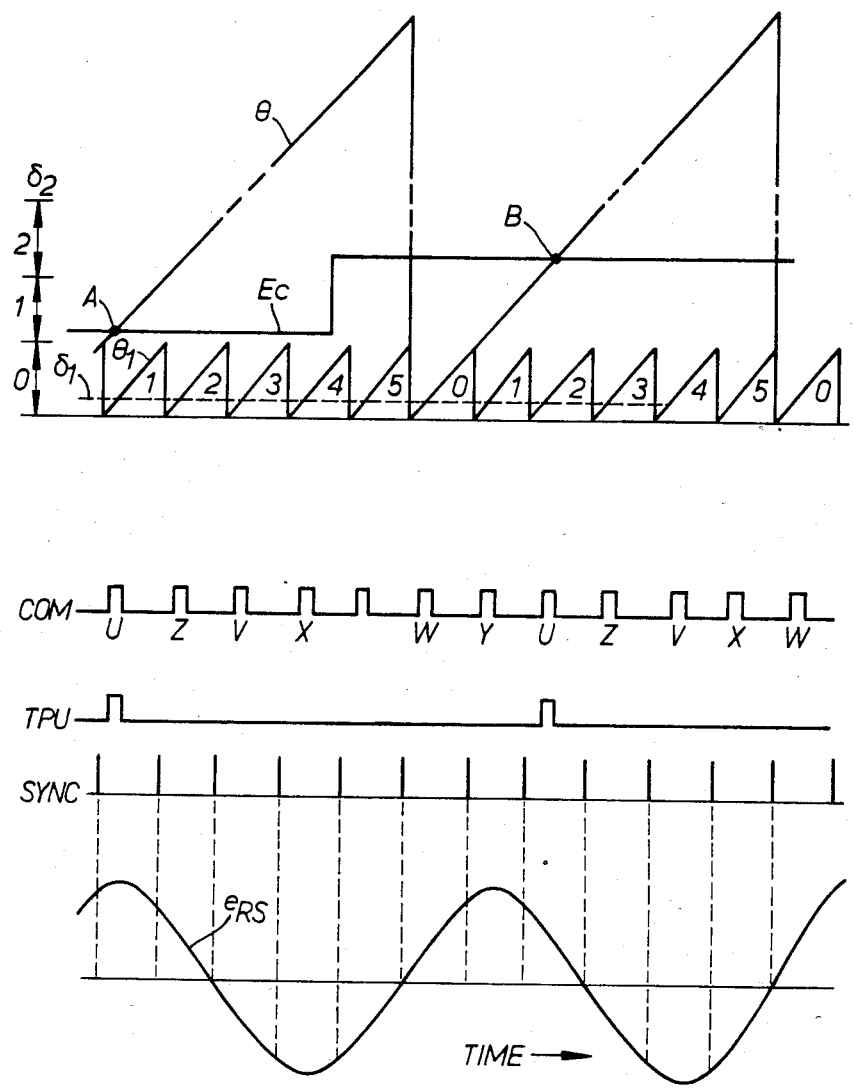
FIG. 5 is a time chart for explaining the operation of the firing pulse determination circuit 12 shown in FIG. 2.

In FIG. 5, after the appearance of the firing pulse TPU at the instant A the subsequent firing pulse TPU with respect to the same thyristor U is outputted at an instant B. This case shows that the phase control device 2A is in normal operation. But if after the appearance of the firing pulse TPU the subsequent firing pulse TPU is not outputted within the above-described period of 540° of the electrical angle of the AC power source, the phase control device 2A is judged to be in failure, thereby causing the second monitoring circuit 42 to output the second fault indicating signal F2.

As described above, when the digital phase signal $\theta$ becomes abnormal due to, for example, a failure of the digital phase detector 10 or the digital phase control signal Ec becomes abnormal due to, for example, a failure of the digital processing circuit 11, such abnormalities are usually detected by the first monitoring circuit 41. The abnormalities caused by failure of the firing pulse determination circuit 12 are usually detected by the second monitoring circuit 42.

In the aforementioned embodiment, monitoring operations are made along with the repetition of resetting the counter in the second monitoring circuit 42 at every 1.5 cycle of the AC power source voltage, so that rapid protective operation can be performed, whereby serious accidents of the entire main circuit apparatus can be nipped in the bud.

Figure 8:
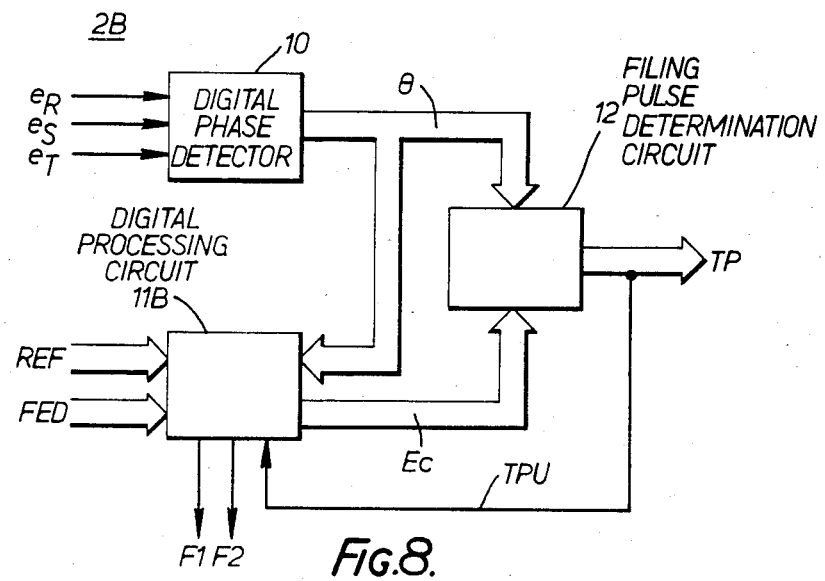
FIG. 8 is a block diagram illustrating a detailed configuration of a phase control device according to a second embodiment of this invention.

The first and second monitoring circuits 41 and 42 in the above-described embodiment can also be realized by use of a microcomputer. FIG. 8 shows a phase control device 2B according to a second preferred embodiment of this invention, which is used for controlling the power converter 1 instead of the phase control device 2 shown in FIG. 1. The phase control device 2B includes the digital phase detector 10, a digital processing circuit 11B and the firing pulse determination circuit 12. The digital processing circuit 11B includes a microcomputer and is designed to have the functions performed in the digital processing circuit 11 and the first and second monitoring circuits 41 and 42 in the phase control device 2A shown in FIG. 6. The digital processing circuit 11B receives the reference signal REF, the feedback signal FED, the digital phase signal $\theta$ from the digital phase detector 10 and the firing pulse TPU from the firing pulse determination circuit 12. The digital processing circuit 11B outputs the digital phase control signal Ec, and the first and second fault indicating signals F1 and F2 based on the received signals.

Here, the function of the first monitoring circuit 41 in FIG. 6 is performed as follows. The digital processing circuit 11B reads the digital phase signal $\theta$ from the digital phase detector 10 upon reception of the firing signal TPU from the firing phase determination circuit 12 as the interruption signal. Next, the digital processing circuit 11B compares the digital phase signal $\theta$ with the digital phase control signal Ec which has been calculated based on the reference signal REF and the feedback signal FED in the digital processing circuit 11B. When the difference between the value of the digital phase signal $\theta$ and that of the digital phase control signal Ec is large, namely these two signals are not in the above-described specific condition, the digital processing circuit 11B outputs the first fault indicating signal F1.

Figure 4:
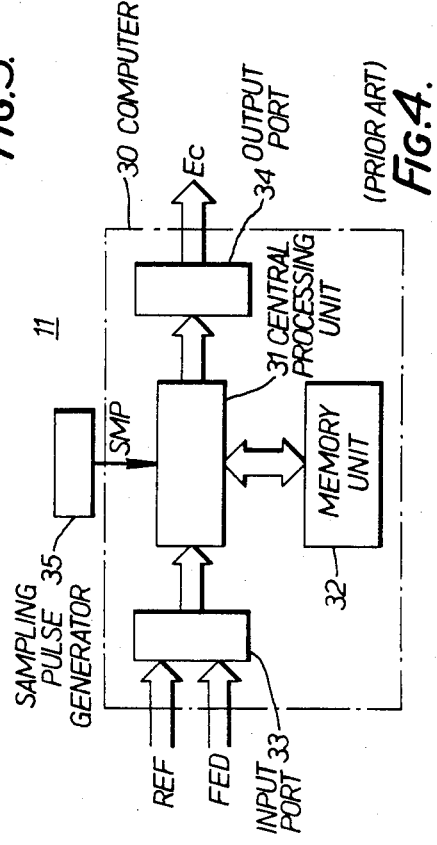
FIG. 4 is a block diagram illustrating a detailed configuration of the digital processing circuit 11 shown in FIG. 2.

The function of the second monitoring circuit 42 in FIG. 6 is performed as follows. Within the period from a certain instant at which the firing pulse TPU is received to an instant at which the subsequent firing pulse TPU is received, the digital processing circuit 11B counts the number of the sampling pulses SMP from the sampling pulse generator 35 of FIG. 4. When the count exceeds a value corresponding to 1.5 cycle of the AC power source voltage, the firing pulse determination circuit 12 is judged to be abnormal, and the digital processing circuit 11B outputs the second fault indicating signal F2.

The above-described fault detecting operations are performed in accordance with a program incorporated within the digital processing circuit 11B. Thus, the phase control device 11B shown in FIG. 8 has the advantage that the hardware configuration thereof is simplified.

In the two aforementioned embodiments, the firing pulse TPU is used in the first and second monitoring circuits 41 and 42 or in the digital processing circuit 11B, but the other firing pulses TPV, TPW, TPX, TPY and TPZ can be used as the input signal to the first and second monitoring circuits 41 and 42 or to the digital processing circuit 11B. In this case the first monitoring circuit 41 or the digital processing circuit 11B is modified to compare the phase synchronizing signal $\theta 1$ with the control signal $\delta 1$ instead of the comparison of the digital phase signal $\theta$ with the digital phase control signal Ec. The first monitoring circuit 41 then produces the comparison signal based on the comparison result as described in the case of the comparison of the digital phase signal $\theta$ with the digital phase control signal Ec.

Figure 9:
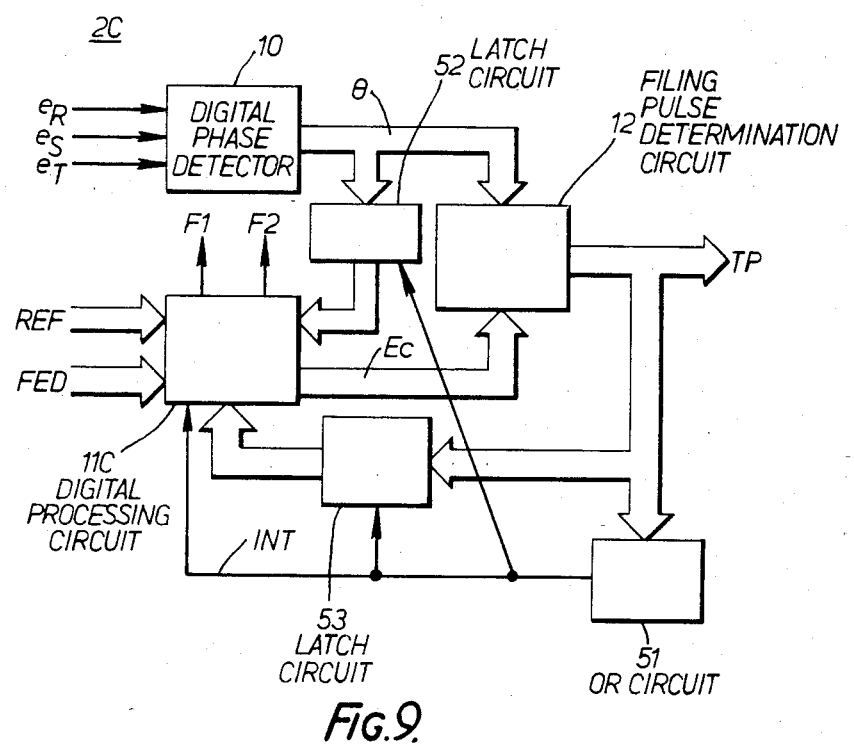
FIG. 9 is a block diagram illustrating a detailed configuration of a phase control device according to a third embodiment of this invention.

FIG. 9 shows a phase control device 2C according to a third embodiment of this invention, which is used for controlling the power converter 1 instead of the phase control device 2 shown in FIG. 1. The phase control device 2C is designed for outputting the first and the second fault indicating signals F1 and F2 in more rapid manner, and includes the digital phase detector 10, a digital processing circuit 11C and the firing phase determination circuit 12. The phase control device 2C further includes an OR circuit 51 and latch circuits 52 and 53. The OR circuit 51 is connected to receive the firing pulses TPU, TPV, TPW, TPX, TPY and TPZ from the firing pulse determination circuit 12 and produces the logical sum thereof as an interruption signal INT. The latch circuit 52 holds the digital phase signal $\theta$ upon reception of the interruption signal INT. The latch circuit 53 holds the firing pulses TPU, TPV, TPW, TPX, TPY and TPZ upon reception of the interruption signal INT.

The digital processing circuit 11C receives the reference signal REF, the feedback signal FED, and the interruption signal INT from the OR circuit 51. The digital processing circuit 11C is further connected to the output terminals of the latch circuits 52 and 53. The digital processing circuit 11C outputs the digital phase control signal Ec, and the first and second fault indicating signals F1 and F2 based on the received signals.

The functions of the digital processing circuit 11C are as follows. The digital processing circuit 11C reads the digital phase signal $\theta$ held in the latch circuit 52 and one of the firing pulses TPU, TPV, TPW, TPX, TPY and TPZ held in the latch circuit 53 upon reception of the interruption signal INT. Then, the digital processing circuit 11C compares, in accordance with the received firing pulse TPU, TPV, TPW, TPX, TPY or TPZ, the phase synchronizing signal $\theta 1$ of the digital phase signal $\theta$ with the control signal $\delta 1$ of the digital phase control signal Ec, which has been calculated based on the reference signal REF and the feedback signal FED in the digital processing circuit 11C. When the phase synchronizing signal $\theta 1$ and the control signal $\delta 1$ are not in the above-described specific condition, the digital processing circuit 11C outputs the first fault indicating signal F1. Thus, the phase control device 2C can reduce the fault detection time to less than a half cycle of the AC power source voltage (10 milliseconds in the case of 50 Hz). In addition, when a failure occurs in the phase control device 11C, fault detection can be made by the first firing pulse TPU, TPV, TPW, TPX, TPY or TPZ appearing after occurrence of the failure.

In this embodiment, the function of producing the second fault indicating signal F2 is performed as follows. Within the period from a certain instant at which the interruption signal INT is received to an instant at which the subsequent interruption signal INT is received, the digital processing circuit 11C counts the number of the sampling pulses from the sampling pulse generator 35 of FIG. 4. When the count exceeds a value corresponding to, for example an electrical angle of 90° of the AC power source voltage, the firing pulse determination circuit 12 is judged to be abnormal, and the digital processing circuit 11C outputs the second fault indicating signal F2. In this embodiment a failure which can be detected by the second fault indicating signal F2 can be detected more radidly than in the embodiment shown in FIGS. 6 or 8.

As described above, the accidents in the phase control device 2C, the power converter 1 controlled by the phase control device 2C or the entire apparatus including the power converter 1 can be nipped in the bud or at least can be reduced to a minimum.

In the aforementioned embodiments, a flow chart executed by the digital processing circuit 11B or 11C has not been described. But it is believed that those skilled in the art can easily derive a program to be executed in the digital processing circuit 11B or 11C based on the above-described detailed description. Accordingly, the description of such flow chart has been omitted.

In the aforementioned description, the phase control device having both the first and the second monitoring circuits has been explained. But this invention is not limited to these embodiments. According to this invention, the phase control device with only the first monitoring circuit may be provided for controlling the power converter, which can detect almost all of the failures in the phase control device.

In the aforementioned embodiments, the phase control device according to this invention has been applied to the power converter having thyristors as the controlled rectifier elements. But this invention is not limited to these embodiments. Namely, this invention can be applied to the power converter having other type of the controlled rectifier elements, such as gate turn-off thyristors. This invention is also applicable to other types of power converter such as a single-phase power converters.

Moreover, so long as such circuits as the digital phase detector, the digital processing unit and the firing pulse determination circuit are provided with the aforementioned functions, partial or whole modifications can be realized. Further, the partial or whole circuit thereof can also be substituted by analog circuits.

As described above, according to this invention, failures in the phase control device can be rapidly detected, so that adverse influences that may spread to the power converter or the main circuit including the same can be reduced to a minimum. Furthermore, according to this invention, there can be provided a highly reliable and readily maintainable phase control device for a power converter with less sophisticated configuration.

Obviously, numerous modifications and variations of the present invention are possible in light of the above teachings. It is therefore to be understood that within the scope of the appended claims, the invention may be practiced otherwise than as specifically described herein:

What is claimed as new and desired to be secured by Letters Patent of the United States is:

1. A phase control device for a power converter with a plurality of controlled rectifier elements, comprising:
   phase detector means adapted for connection to said power converter to receive an AC voltage of said power converter for detecting a phase of said AC voltage to produce a phase signal, said phase signal including a phase synchronizing signal and a phase judging signal;
   processing means adapted for connection to said power converter to receive an electrical quantity appearing at one of an AC side and a DC side of said power converter as a feedback signal for comparing said feedback signal with a reference signal to produce a phase control signal so that said feedback signal becomes equal to said reference signal, said phase control signal including a control signal and an angle signal; and firing pulse determination means connected to receive said phase signal from said phase detector means and said phase control signal from said processing means for comparing said phase signal with said phase control signal to produce a plurality of firing pulses based on the comparison result, said firing pulses being adapted to be connected to selected of said controlled rectifier elements to fire each of said controlled rectifier elements, said firing pulses outputted at a time determined by the result of the comparison of said phase synchronizing signal with said control signal, wherein it is determined which of said firing pulses is connected to which of said controlled rectifier elements by the result of the comparison of said phase judging signal with said angle signal;

said processing means being connected to receive one of said firing pulses from said firing pulse determination means as a specific firing pulse and said phase signal from said phase detector means and including monitoring means; and said monitoring means being connected to receive said phase synchronizing signal, said control signal and said specific firing pulse for judging whether or not said phase control device has failed based on said phase synchronizing signal and said control signal upon reception of said specific firing pulse to produce a fault indicating signal based on the judgment result.

2. The phase control device according to claim 1, wherein:

said monitoring means includes first monitoring means connected to receive said phase synchronizing signal, said control signal and said specific firing pulse for judging whether or not the difference between a value of said phase synchronizing signal and a value of said control signal is in a predetermined range upon reception of said specific firing pulse to produce a first fault indicating signal as said fault indicating signal when the difference is not in said predetermined range.

3. The phase control device according to claim 1, wherein:

said monitoring means includes first monitoring means and second monitoring means;

said first monitoring means is connected to receive said phase synchronizing signal, said control signal and said specific firing pulse, judges whether or not the difference between a value of said phase synchronizing signal and a value of said control signal is in a predetermined range upon reception of said specific firing pulse to produce a first fault indicating signal when the difference is not in said predetermined range;

said second monitoring means is connected to receive said specific firing pulse, judges whether or not after said specific firing pulse is received a subsequent firing pulse is received from said firing pulse determination means within a specific time period and produces a second fault indicating signal when said subsequent firing pulse is not received within the specific time period; and said fault indicating signal includes said first fault indicating signal and said second fault indicating signal.

4. The phase control device according to claim 3, wherein:

second monitoring means determines said specific time period so as to correspond to an electrical angle of 540° of said AC voltage.

5. The phase control device according to claim 3, further comprising:

OR circuit means connected to receive said firing pulses from said firing pulse determination means for producing a logical sum of said firing pulses to serve as an interruption signal;

first latch means connected to receive said phase signal from said phase detector means and said interruption signal from said OR circuit means for holding said phase signal upon reception of said interruption signal; and second latch means connected to receive said firing pulses from said firing pulse determination means and said interruption signal from said OR circuit means for holding one of said firing pulses as a selected firing pulse upon reception of said interruption signal;

wherein said processing means receives said phase signal from said first latch means and said selected firing pulse from said second latch means upon reception of said interruption signal, said first monitoring means receives said selected firing pulse as said specific firing pulse and produces said first fault indicating signal upon reception of said selected firing pulse when the difference is not in said predetermined range, and said second monitoring means receives said interruption signal as said specific firing pulse and produces said second fault indicating signal based on said interruption signal.

* * * * *